US011962087B2

(12) United States Patent
Brandenburg et al.

(10) Patent No.: US 11,962,087 B2
(45) Date of Patent: *Apr. 16, 2024

(54) RADAR ANTENNA SYSTEM COMPRISING AN AIR WAVEGUIDE ANTENNA HAVING A SINGLE LAYER MATERIAL WITH AIR CHANNELS THEREIN WHICH IS INTERFACED WITH A CIRCUIT BOARD

(71) Applicant: Aptiv Technologies AG, Schaffhausen (CH)

(72) Inventors: Scott D. Brandenburg, Kokomo, IN (US); David Wayne Zimmerman, Noblesville, IN (US); Mark William Hudson, Russiaville, IN (US); Sophie Macfarland, Carmel, IN (US)

(73) Assignee: Aptiv Technologies AG, Schaffhausen (CH)

(*) Notice: Subject to any disclaimer, the term of this patent is extended or adjusted under 35 U.S.C. 154(b) by 0 days.

This patent is subject to a terminal disclaimer.

(21) Appl. No.: 18/163,091

(22) Filed: Feb. 1, 2023

(65) Prior Publication Data
US 2023/0378656 A1 Nov. 23, 2023

Related U.S. Application Data

(63) Continuation of application No. 17/353,595, filed on Jun. 21, 2021, now Pat. No. 11,616,306.
(Continued)

(51) Int. Cl.
*H01Q 13/22* (2006.01)
*H01P 3/12* (2006.01)
(Continued)

(52) U.S. Cl.
CPC ............. *H01Q 13/22* (2013.01); *H01P 3/121* (2013.01); *H01P 5/107* (2013.01); *H01P 11/002* (2013.01); *H01Q 21/0043* (2013.01); *G01S 7/032* (2013.01)

(58) Field of Classification Search
CPC .......... H01P 3/121; H01P 3/12; H01P 11/002; H01Q 13/20; H01Q 13/22
(Continued)

(56) References Cited

U.S. PATENT DOCUMENTS 2,840,818 A 6/1958 Reed et al.
3,462,713 A 8/1969 Knerr
(Continued)

FOREIGN PATENT DOCUMENTS

CA 2654470 A1 12/2007
CN 1620738 A 5/2005
(Continued)

OTHER PUBLICATIONS

"Foreign Office Action", CN Application No. 202111321802.9, dated Jul. 29, 2023, 17 pages.
(Continued)

*Primary Examiner* — Benny T Lee
(74) *Attorney, Agent, or Firm* — Harness, Dickey & Pierce, P.L.C.

(57) ABSTRACT

This document describes a single-layer air waveguide antenna integrated on a circuit board. The waveguide guides electromagnetic energy through channels filled with air. It is formed from a single layer of material, such as a sheet of metal, metal-coated plastic, or other material with conductive surfaces that is attached to a circuit board. A portion of a surface of the circuit board is configured as a floor of the channels filled with air. This floor is an electrical interface between the circuit board and the channels filled with air.
(Continued)

The single layer of material is positioned atop this electrical interface to define walls and a ceiling of the channels filled with air. The single layer of material can be secured to the circuit board in various ways. The cost of integrating an air waveguide antenna on to a circuit board this way may be less expensive than other waveguide-manufacturing techniques.

17 Claims, 11 Drawing Sheets

Related U.S. Application Data

(60) Provisional application No. 63/193,538, filed on May 26, 2021, provisional application No. 63/170,145, filed on Apr. 2, 2021, provisional application No. 63/164,368, filed on Mar. 22, 2021.

(51) Int. Cl.
H01P 5/107 (2006.01)
H01P 11/00 (2006.01)
H01Q 21/00 (2006.01)
G01S 7/03 (2006.01)

(58) Field of Classification Search
USPC .......................................... 333/239; 343/771
See application file for complete search history.

(56) References Cited

U.S. PATENT DOCUMENTS

| | | |
|---|---|---|
| 3,579,149 A | 5/1971 | Ramsey |
| 4,157,516 A | 6/1979 | Grijp |
| 4,453,142 A | 6/1984 | Murphy |
| 4,562,416 A | 12/1985 | Sedivec |
| 5,065,123 A | 11/1991 | Heckaman et al. |
| 5,350,499 A | 9/1994 | Shibaike et al. |
| 5,414,394 A | 5/1995 | Gamand et al. |
| 5,637,521 A | 6/1997 | Rhodes et al. |
| 5,923,225 A | 7/1999 | Santos |
| 5,929,728 A | 7/1999 | Barnett et al. |
| 5,982,250 A | 11/1999 | Hung et al. |
| 5,982,256 A | 11/1999 | Uchimura et al. |
| 5,986,527 A | 11/1999 | Ishikawa et al. |
| 6,064,350 A | 5/2000 | Uchimura et al. |
| 6,072,375 A | 6/2000 | Adkins et al. |
| 6,127,901 A | 10/2000 | Lynch |
| 6,414,573 B1 | 7/2002 | Swineford et al. |
| 6,489,855 B1 | 12/2002 | Kitamori et al. |
| 6,535,083 B1 | 3/2003 | Hageman et al. |
| 6,622,370 B1 | 9/2003 | Sherman et al. |
| 6,658,233 B1 | 12/2003 | Ikeda |
| 6,788,918 B2 | 9/2004 | Saitoh et al. |
| 6,794,950 B2 | 9/2004 | Toit et al. |
| 6,859,114 B2 | 2/2005 | Eleftheriades et al. |
| 6,867,660 B2 | 3/2005 | Kitamori et al. |
| 6,958,662 B1 | 10/2005 | Salmela et al. |
| 6,995,726 B1 | 2/2006 | West et al. |
| 7,142,165 B2 | 11/2006 | Sanchez et al. |
| 7,276,988 B2 | 10/2007 | Stoneham |
| 7,420,442 B1 | 9/2008 | Forman |
| 7,439,822 B2 | 10/2008 | Shimura et al. |
| 7,495,532 B2 | 2/2009 | McKinzie, III |
| 7,626,476 B2 | 12/2009 | Kim et al. |
| 7,659,799 B2 | 2/2010 | Jun et al. |
| 7,886,434 B1 | 2/2011 | Forman |
| 7,973,616 B2 | 7/2011 | Shijo et al. |
| 7,994,879 B2 | 8/2011 | Kim et al. |
| 8,013,694 B2 | 9/2011 | Hiramatsu et al. |
| 8,089,327 B2 | 1/2012 | Margomenos et al. |
| 8,159,316 B2 | 4/2012 | Miyazato et al. |
| 8,395,552 B2 | 3/2013 | Geiler et al. |
| 8,451,175 B2 | 5/2013 | Gummalla et al. |
| 8,451,189 B1 | 5/2013 | Fluhler |
| 8,680,936 B2 | 3/2014 | Purden et al. |
| 8,692,731 B2 | 4/2014 | Lee et al. |
| 8,717,124 B2 | 5/2014 | Vanhille et al. |
| 8,803,638 B2 | 8/2014 | Kildal |
| 8,948,562 B2 | 2/2015 | Norris et al. |
| 9,007,269 B2 | 4/2015 | Lee et al. |
| 9,203,155 B2 | 12/2015 | Choi et al. |
| 9,246,204 B1 | 1/2016 | Kabakian |
| 9,258,884 B2 | 2/2016 | Saito |
| 9,356,238 B2 | 5/2016 | Norris et al. |
| 9,450,281 B2 | 9/2016 | Kim |
| 9,647,313 B2 | 5/2017 | Marconi et al. |
| 9,653,773 B2 | 5/2017 | Ferrari et al. |
| 9,673,532 B2 | 6/2017 | Cheng et al. |
| 9,806,393 B2 | 10/2017 | Kildal et al. |
| 9,813,042 B2 | 11/2017 | Xue et al. |
| 9,843,301 B1 | 12/2017 | Rodgers et al. |
| 9,935,065 B1 | 4/2018 | Baheti et al. |
| 9,947,981 B1 | 4/2018 | Strassner et al. |
| 9,991,606 B2 | 6/2018 | Kirino et al. |
| 9,997,842 B2 | 6/2018 | Kirino et al. |
| 10,027,032 B2 | 7/2018 | Kirino et al. |
| 10,042,045 B2 | 8/2018 | Kirino et al. |
| 10,090,600 B2 | 10/2018 | Kirino et al. |
| 10,114,067 B2 | 10/2018 | Lam et al. |
| 10,153,533 B2 | 12/2018 | Kirino |
| 10,158,158 B2 | 12/2018 | Kirino et al. |
| 10,164,318 B2 | 12/2018 | Seok et al. |
| 10,164,344 B2 | 12/2018 | Kirino et al. |
| 10,218,078 B2 | 2/2019 | Kirino et al. |
| 10,230,173 B2 | 3/2019 | Kirino et al. |
| 10,263,310 B2 | 4/2019 | Kildal et al. |
| 10,312,596 B2 | 6/2019 | Gregoire |
| 10,320,083 B2 | 6/2019 | Kirino et al. |
| 10,333,227 B2 | 6/2019 | Kirino et al. |
| 10,374,323 B2 | 8/2019 | Kamo et al. |
| 10,381,317 B2 | 8/2019 | Maaskant et al. |
| 10,381,741 B2 | 8/2019 | Kirino et al. |
| 10,439,298 B2 | 10/2019 | Kirino et al. |
| 10,468,736 B2 | 11/2019 | Mangaiahgari |
| 10,505,282 B2 | 12/2019 | Lilja |
| 10,534,061 B2 | 1/2020 | Vassilev et al. |
| 10,559,889 B2 | 2/2020 | Kirino et al. |
| 10,594,045 B2 | 3/2020 | Kirino et al. |
| 10,601,144 B2 | 3/2020 | Kamo et al. |
| 10,608,345 B2 | 3/2020 | Kirino et al. |
| 10,622,696 B2 | 4/2020 | Kamo et al. |
| 10,627,502 B2 | 4/2020 | Kirino et al. |
| 10,651,138 B2 | 5/2020 | Kirino et al. |
| 10,651,567 B2 | 5/2020 | Kamo et al. |
| 10,658,760 B2 | 5/2020 | Kamo et al. |
| 10,670,810 B2 | 6/2020 | Sakr et al. |
| 10,705,294 B2 | 7/2020 | Guerber et al. |
| 10,707,584 B2 | 7/2020 | Kirino et al. |
| 10,714,802 B2 | 7/2020 | Kirino et al. |
| 10,727,561 B2 | 7/2020 | Kirino et al. |
| 10,727,611 B2 | 7/2020 | Kirino et al. |
| 10,763,590 B2 | 9/2020 | Kirino et al. |
| 10,763,591 B2 | 9/2020 | Kirino et al. |
| 10,775,573 B1 | 9/2020 | Hsu et al. |
| 10,811,373 B2 | 10/2020 | Zaman et al. |
| 10,826,147 B2 | 11/2020 | Sikina et al. |
| 10,833,382 B2 | 11/2020 | Sysouphat |
| 10,833,385 B2 | 11/2020 | Mangaiahgari |
| 10,892,536 B2 | 1/2021 | Fan et al. |
| 10,957,971 B2 | 3/2021 | Doyle et al. |
| 10,957,988 B2 | 3/2021 | Kirino et al. |
| 10,971,824 B2 | 4/2021 | Baumgartner et al. |
| 10,983,194 B1 | 4/2021 | Patel et al. |
| 10,985,434 B2 | 4/2021 | Wagner et al. |
| 10,992,056 B2 | 4/2021 | Kamo et al. |
| 11,061,110 B2 | 7/2021 | Kamo et al. |
| 11,088,432 B2 | 8/2021 | Seok et al. |
| 11,088,464 B2 | 8/2021 | Sato et al. |
| 11,114,733 B2 | 9/2021 | Doyle et al. |
| 11,121,475 B2 | 9/2021 | Yang et al. |
| 11,169,325 B2 | 11/2021 | Guerber et al. |
| 11,171,399 B2 | 11/2021 | Alexanian et al. |
| 11,196,171 B2 | 12/2021 | Doyle et al. |

(56) References Cited

U.S. PATENT DOCUMENTS

| | | |
|---|---|---|
| 11,201,414 B2 | 12/2021 | Doyle et al. |
| 11,249,011 B2 | 2/2022 | Challener |
| 11,283,162 B2 | 3/2022 | Doyle et al. |
| 11,289,787 B2 | 3/2022 | Yang |
| 11,349,183 B2 | 5/2022 | Rahiminejad et al. |
| 11,349,220 B2 | 5/2022 | Alexanian et al. |
| 11,378,683 B2 | 7/2022 | Alexanian et al. |
| 11,411,292 B2 | 8/2022 | Kirino |
| 11,495,871 B2 | 11/2022 | Vosoogh et al. |
| 11,563,259 B2 | 1/2023 | Alexanian et al. |
| 11,611,138 B2 | 3/2023 | Ogawa et al. |
| 11,616,306 B2 * | 3/2023 | Brandenburg et al. ................... H01P 5/107 333/239 |
| 11,626,652 B2 | 4/2023 | Vilenskiy et al. |
| 2002/0021197 A1 | 2/2002 | Elco |
| 2004/0069984 A1 | 4/2004 | Estes et al. |
| 2006/0113598 A1 | 6/2006 | Chen et al. |
| 2006/0145777 A1 | 7/2006 | Mueller |
| 2008/0129409 A1 | 6/2008 | Nagaishi et al. |
| 2008/0150821 A1 | 6/2008 | Koch et al. |
| 2009/0040132 A1 | 2/2009 | Sridhar et al. |
| 2009/0207090 A1 | 8/2009 | Pettus et al. |
| 2009/0243762 A1 | 10/2009 | Chen et al. |
| 2010/0193935 A1 | 8/2010 | Lachner et al. |
| 2011/0140810 A1 | 6/2011 | Leiba et al. |
| 2011/0140979 A1 | 6/2011 | Dayan et al. |
| 2012/0013421 A1 | 1/2012 | Hayata |
| 2012/0050125 A1 | 3/2012 | Leiba et al. |
| 2012/0068316 A1 | 3/2012 | Ligander |
| 2012/0163811 A1 | 6/2012 | Doany et al. |
| 2012/0242421 A1 | 9/2012 | Robin et al. |
| 2012/0256707 A1 | 10/2012 | Leiba et al. |
| 2012/0256796 A1 | 10/2012 | Leiba |
| 2013/0057358 A1 | 3/2013 | Anthony et al. |
| 2013/0256849 A1 | 10/2013 | Danny et al. |
| 2014/0015709 A1 | 1/2014 | Shijo et al. |
| 2014/0048310 A1 | 2/2014 | Montevirgen et al. |
| 2014/0091884 A1 | 4/2014 | Flatters |
| 2014/0106684 A1 | 4/2014 | Burns et al. |
| 2015/0097633 A1 | 4/2015 | Devries et al. |
| 2015/0229017 A1 | 8/2015 | Suzuki et al. |
| 2015/0295297 A1 | 10/2015 | Cook et al. |
| 2015/0357698 A1 | 12/2015 | Kushta |
| 2015/0364804 A1 | 12/2015 | Tong et al. |
| 2015/0364830 A1 | 12/2015 | Tong et al. |
| 2016/0043455 A1 | 2/2016 | Seler et al. |
| 2016/0049714 A1 | 2/2016 | Ligander et al. |
| 2016/0056541 A1 | 2/2016 | Tageman et al. |
| 2016/0111764 A1 | 4/2016 | Kim |
| 2016/0118705 A1 | 4/2016 | Tang et al. |
| 2016/0204495 A1 | 7/2016 | Takeda et al. |
| 2016/0276727 A1 | 9/2016 | Dang et al. |
| 2016/0293557 A1 | 10/2016 | Topak et al. |
| 2016/0301125 A1 | 10/2016 | Kim et al. |
| 2017/0084554 A1 | 3/2017 | Dogiamis et al. |
| 2017/0099705 A1 | 4/2017 | Mazzon |
| 2017/0324135 A1 | 11/2017 | Blech et al. |
| 2018/0131084 A1 | 5/2018 | Park et al. |
| 2018/0226709 A1 | 8/2018 | Mangaiahgari |
| 2018/0226727 A1 | 8/2018 | Sato |
| 2018/0233465 A1 | 8/2018 | Spella et al. |
| 2018/0284186 A1 | 10/2018 | Chadha et al. |
| 2018/0301816 A1 | 10/2018 | Kamo et al. |
| 2018/0343711 A1 | 11/2018 | Wixforth et al. |
| 2018/0351261 A1 | 12/2018 | Kamo et al. |
| 2018/0375185 A1 | 12/2018 | Kirino et al. |
| 2019/0006743 A1 | 1/2019 | Kirino et al. |
| 2019/0013563 A1 | 1/2019 | Takeda et al. |
| 2019/0194452 A1 | 6/2019 | Schrauwen |
| 2019/0207286 A1 | 7/2019 | Moallem |
| 2020/0021001 A1 | 1/2020 | Mangaiahgari |
| 2020/0153108 A1 | 5/2020 | Jemichi |
| 2020/0220273 A1 | 7/2020 | Ahmadloo |
| 2020/0235453 A1 | 7/2020 | Lang |
| 2020/0287293 A1 | 9/2020 | Shi et al. |
| 2020/0343612 A1 | 10/2020 | Shi |
| 2020/0412012 A1 | 12/2020 | Zhao et al. |
| 2021/0028549 A1 | 1/2021 | Doyle et al. |
| 2021/0036393 A1 | 2/2021 | Mangaiahgari |
| 2021/0159577 A1 | 5/2021 | Carlred et al. |
| 2021/0305667 A1 | 9/2021 | Bencivenni |
| 2021/0367352 A1 | 11/2021 | Izadian et al. |
| 2022/0094071 A1 | 3/2022 | Doyle et al. |
| 2022/0109246 A1 | 4/2022 | Emanuelsson et al. |

FOREIGN PATENT DOCUMENTS

| | | |
|---|---|---|
| CN | 1682404 A | 10/2005 |
| CN | 2796131 | 7/2006 |
| CN | 201383535 | 1/2010 |
| CN | 102696145 A | 9/2012 |
| CN | 103515682 A | 1/2014 |
| CN | 104900956 A | 9/2015 |
| CN | 105098295 A | 11/2015 |
| CN | 105609909 A | 5/2016 |
| CN | 105680133 A | 6/2016 |
| CN | 105958167 A | 9/2016 |
| CN | 106711616 A | 5/2017 |
| CN | 106785424 A | 5/2017 |
| CN | 109716861 A | 5/2019 |
| CN | 109750201 A | 5/2019 |
| CN | 209389219 U | 9/2019 |
| DE | 4241635 A1 | 6/1994 |
| DE | 102016213202 A1 | 1/2018 |
| DE | 102019200893 A1 | 7/2020 |
| EP | 2500978 A1 | 9/2012 |
| EP | 2843758 A1 | 3/2015 |
| EP | 2945222 A1 | 11/2015 |
| EP | 3460903 A1 | 3/2019 |
| GB | 2489950 A | 10/2012 |
| JP | 2000357916 A | 12/2000 |
| JP | 2003243902 A | 8/2003 |
| JP | 2003289201 A | 10/2003 |
| JP | 3923360 B2 | 5/2007 |
| KR | 20030031585 A | 4/2003 |
| KR | 20080044752 A | 5/2008 |
| KR | 1020080044752 A | 5/2008 |
| WO | 2013189513 A1 | 12/2013 |
| WO | 2018003932 A1 | 1/2018 |
| WO | 2018095541 A1 | 5/2018 |
| WO | 2019085368 A1 | 5/2019 |
| WO | 2021122725 A1 | 6/2021 |

OTHER PUBLICATIONS

"Foreign Office Action", CN Application No. 202210282861.8, dated Jun. 1, 2023, 13 pages.

"Foreign Office Action", EP Application No. 21203201.5, dated Jun. 15, 2023, 11 pages.

"Extended European Search Report", EP Application No. 21203201.5, dated Apr. 7, 2022, 12 pages.

"Extended European Search Report", EP Application No. 22170487.7, dated Sep. 8, 2022, 11 pages.

"Extended European Search Report", EP Application No. 22188348.1, dated Mar. 14, 2023, 8 pages.

"Foreign Office Action", CN Application No. 201810122408.4, dated Jan. 26, 2022, 15 pages.

"Foreign Office Action", CN Application No. 201810122408.4, dated Jan. 30, 2023, 21 pages.

"Foreign Office Action", CN Application No. 201810122408.4, dated May 6, 2022, 15 pages.

"Foreign Office Action", CN Application No. 201810122408.4, dated Sep. 20, 2022, 19 pages.

"Foreign Office Action", CN Application No. 202111321802.9, dated Mar. 31, 2023, 16 pages.

"Foreign Office Action", CN Application No. 202111321802.9, dated Nov. 22, 2022, 17 pages.

Bauer, et al., "A wideband transition from substrate integrated waveguide to differential microstrip lines in multilayer substrates", Sep. 2010, pp. 811-813.

(56) References Cited

OTHER PUBLICATIONS

Dai, et al., "An Integrated Millimeter-Wave Broadband Microstrip-to-Waveguide Vertical Transition Suitable for Multilayer Planar Circuits", IEEE Microwave and Wireless Components Letters, vol. 26, No. 11, 2016, pp. 897-899.
Deslandes, et al., "Integrated Transition of Coplanar to Rectangular Waveguides", 2001 IEEE MTT-S International Microwave Sympsoium Digest, pp. 619-622.
Deutschmann, et al., "A Full W-Band Waveguide-to-Differential Microstrip Transition", Jun. 2019, pp. 335-338.
Ghahramani, et al., "Reducing Mutual Coupling of SIW Slot Array Antenna Using Uniplanar Compact EBG (UC-EBG) Structure", The 8th European Conference on Antennas and Propagation (EuCAP 2014), Apr. 6, 2014, pp. 2002-2004.
Giese, et al., "Compact Wideband Single-ended and Differential Microstrip-to-waveguide Transitions at W-band", Jul. 2015, 4 pages.
Henawy, et al., "Integrated Antennas in eWLB Packages for 77 GHZ and 79 GHZ Automotive Radar Sensors", 2011 41st European Microwave Conference, Oct. 10, 2011, pp. 1312-1315.
Rajo-Iglesias, et al., "Gap Waveguide Technology for Millimeter-Wave Antenna Systems", IEEE Communications Magazine, vol. 56, No. 7, Jul. 2018, pp. 14-20.
Schellenberg, et al., "CAD Models for Suspended and Inverted Microstrip", IEEE Transactions on Microwave Theory and Techniques, vol. 43, No. 6, Jun. 1995, pp. 1247-1252.
Tong, et al., "A Vertical Transition Between Rectangular Waveguide and Coupled Microstrip Lines", IEEE Microwave and Wireless Components Letters, vol. 22, No. 5, May 2012, pp. 251-253.
Tong, et al., "A Wide Band Transition from Waveguide to Differential Microstrip Lines", Dec. 2008, 5 pages.
Topak, et al., "Compact Topside Millimeter-Wave Waveguide-to-Microstrip Transitions", IEEE Microwave and Wireless Components Letters, vol. 23, No. 12, Dec. 2013, pp. 641-643.
Yuasa, et al., "A millimeter wave wideband differential line to waveguide transition using short ended slot line", Oct. 2014, pp. 1004-1007.
"Extended European Search Report", EP Application No. 18153137.7, dated Jun. 15, 2018, 8 pages.
"Extended European Search Report", EP Application No. 20166797, dated Sep. 16, 2020, 11 pages.
"Extended European Search Report", EP Application No. 22159217.3, dated Aug. 19, 2022, 11 pages.
"Foreign Office Action", CN Application No. 201810122408.4, dated Jun. 2, 2021, 15 pages.
"Foreign Office Action", CN Application No. 201810122408.4, dated Oct. 18, 2021, 19 pages.
Jankovic, et al., "Stepped Bend Substrate Integrated Waveguide to Rectangular Waveguide Transitions", Jun. 2016, 2 pages.
Wang, et al., "Mechanical and Dielectric Strength of Laminated Epoxy Dielectric Graded Materials", Mar. 2020, 15 pages.
"Extended European Search Report", EP Application No. 23167063.9, dated Sep. 11, 2023, 12 pages.
"Extended European Search Report", EP Application No. 23167836.8, dated Sep. 11, 2023, 10 pages.
Ferrando-Rocher Miguel et al: "A Half-Mode Groove Gap Waveguide for Single-Layer Antennas in the Millimeter-Wave Band", IEEE Antennas and Wireless Propagation Letters, IEEE, Piscataway, NJ, US, vol. 21, No. 12, Jul. 27, 2022, pp. 2402-2406, XP011928651, ISSN: 1536-1225, DOI: 10.1109/LAWP.2022.3194665.

* cited by examiner 104-2

108-2

600

```
┌─────────────────────────────────────────────────────────┐
│ Identify a portion of a surface of a circuit board to act as an electrical │
│         interface to waveguide channels filled with air                    │
│                              602                                           │
└─────────────────────────────────────────────────────────┘
                              │
                              ▼
┌─────────────────────────────────────────────────────────┐
│ Obtain a single layer of material with conductive surfaces that define │
│     walls and a ceiling of the waveguide channels filled with air      │
│                              604                                        │
└─────────────────────────────────────────────────────────┘
                              │
                              ▼
┌─────────────────────────────────────────────────────────┐
│ Position the single layer of material atop the portion of the surface of │
│                         the circuit board                                 │
│                              606                                          │
└─────────────────────────────────────────────────────────┘
                              │
                              ▼
┌─────────────────────────────────────────────────────────┐
│ Attach the single layer of material to the portion of the surface of the │
│ circuit board to form an air waveguide antenna that is configured to     │
│ guide electromagnetic energy through the waveguide channels filled       │
│                              with air                                     │
│                              608                                          │
└─────────────────────────────────────────────────────────┘
```

*FIG. 6*

RADAR ANTENNA SYSTEM COMPRISING AN AIR WAVEGUIDE ANTENNA HAVING A SINGLE LAYER MATERIAL WITH AIR CHANNELS THEREIN WHICH IS INTERFACED WITH A CIRCUIT BOARD

CROSS-REFERENCE TO RELATED APPLICATIONS

This application is a continuation of U.S. Pat. No. 11,616, 306 B2, issued Mar. 28, 2023, which claims the benefit under 35 U.S.C. 119(e) of U.S. Provisional Patent Application No. 63/193,538, filed May 26, 2021, U.S. Provisional Patent Application No. 63/170,145, filed Apr. 2, 2021, and U.S. Provisional Patent Application No. 63/164,368, filed Mar. 22, 2021, the disclosures of each of which are incorporated by reference in their entireties herein.

BACKGROUND

Air waveguides are used in many applications, for example, as antennas to shape or filter, based on frequency, an electromagnetic energy beam. Channels filled with air are some of the internal features of an air waveguide. These channels may include openings, referred to as "radiators" or "slots", that allow electromagnetic energy to be filtered in or filtered out. Some waveguide channels may be formed from multiple layers of substrate material, stacked, and soldered together to form walls of a channel. Other air waveguides have been formed using polytetrafluoroethylene (e.g., Teflon™) and FR4 Printed Circuit Board (PCB) materials. Still some other air waveguides are manufactured using injection molded plastics (e.g., filled Polyetherimide (PEI)) that are given a metal coating (e.g., silver). Forming air waveguides using existing manufacturing techniques can be too expensive for some applications, including an automotive context where eventual mass-production is desired.

SUMMARY OF THE INVENTION

This document describes a single-layer air waveguide antenna integrated on a circuit board. In one example, an apparatus includes an air waveguide antenna configured to guide electromagnetic energy through channels filled with air. The air waveguide includes an electrical interface to a circuit board and a single layer of material having conductive surfaces positioned atop the electrical interface. The electrical interface configures a portion of a surface of the circuit board to act as a floor of the channels filled with air. The single layer of material defines walls and a ceiling of the channels filled with air.

In another example, a method is described. The method includes identifying a portion of a surface of a circuit board to act as an electrical interface to waveguide channels filled with air. The method further includes obtaining a single layer of material with conductive surfaces that define walls and a ceiling of the waveguide channels filled with air, and positioning the single layer of material atop the portion of the surface of the circuit board. The method further includes attaching the single layer of material to the portion of the surface of the circuit board to form an air waveguide antenna that is configured to guide electromagnetic energy through the waveguide channels filled with air.

This Summary introduces simplified concepts related to a single layer air waveguide that is integrated on a circuit board, as further described in the Detailed Description and Drawings. This Summary is not intended to identify essential features of claimed subject matter, nor is it intended for use in determining the scope of the subject matter claimed.

BRIEF DESCRIPTION OF THE DRAWINGS

The details of one or more aspects of a single-layer air waveguide that is integrated on a circuit board are described in this document with reference to the following figures. The same numbers are often used throughout the drawings and the detail description to reference like features and components:

FIG. 6 illustrates an example process of manufacturing a single layer air waveguide antenna integrated on a circuit board.

DETAILED DESCRIPTION OF THE INVENTION

Overview

Figure 1:
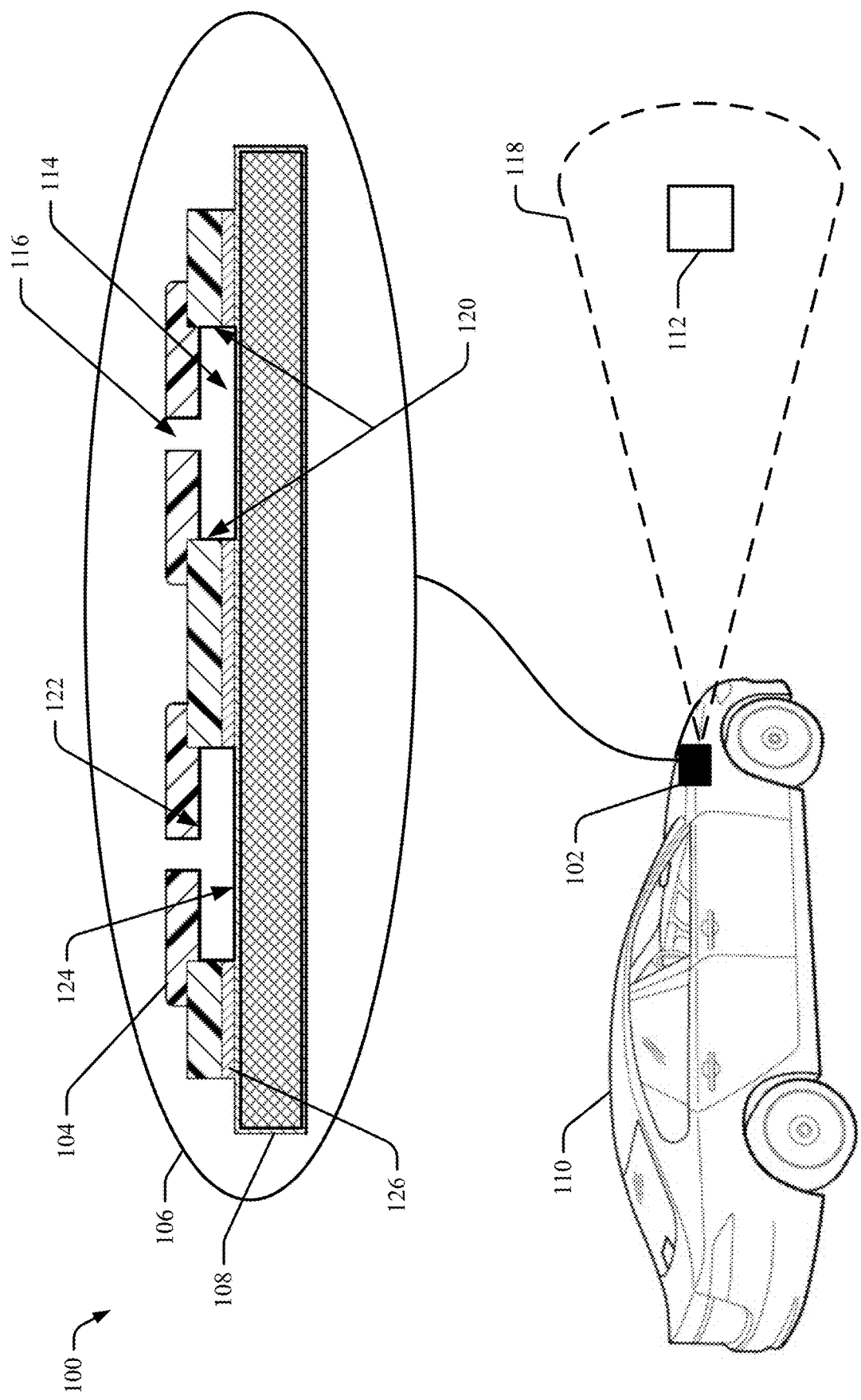
FIG. 1 illustrates an example environment in which a radar system with a single layer air waveguide antenna is integrated on a circuit board that is configured for use on a vehicle.

Radar systems are a sensing technology that some automotive systems rely on to acquire information about the surrounding environment. Radar systems generally use an antenna or a waveguide to direct electromagnetic energy or signals being transmitted or received. Such radar systems may use any combination of antennas and waveguides to provide increased gain and directivity. As the automotive industry increasingly utilizes radar systems in more vehicles, the challenge to reduce costs associated with waveguides for these radar systems becomes a higher priority for manufacturers.

Air waveguides are used in many applications, for example, as antennas to shape or filter, based on frequency, an electromagnetic energy beam. Channels filled with air are some of the internal features of an air waveguide. These channels may include openings, referred to as "radiators" or "slots", that allow electromagnetic energy to be filtered in or filtered out. Some waveguide channels may be formed from multiple layers of substrate material, stacked, and soldered together to form walls of the channels. Other air waveguides have been formed using polytetrafluoroethylene (e.g., Teflon") and FR4 Printed Circuit Board (PCB) materials. Still some other air waveguides are manufactured using injection molded plastics (e.g., filled Polyetherimide (PEI)) that are given a metal coating (e.g., silver) under precisely controlled conditions so as to avoid thermal wear. Forming air waveguides using existing manufacturing techniques can be too expensive for some applications, including an automotive context where eventual mass-production is desired. Lower cost, but still high performance, air waveguide antenna technologies that make radar and other sensing technologies affordable are needed, which can improve driving safety.

This document describes a single-layer air waveguide antenna integrated on a circuit board. The waveguide guides electromagnetic energy through channels filled with air. The waveguide is formed from a single layer of material, such as a sheet of metal, metal-coated plastic, or other material with conductive surfaces that is attached to a circuit board. A portion of a surface of the circuit board is configured as a floor of the channels filled with air. This floor forms an electrical interface between the circuit board and the channels filled with air. The single layer of material is positioned atop this electrical interface to define walls and a ceiling of the channels filled with air. The single layer of material can be secured to the circuit board in various ways. The cost of integrating an air waveguide antenna onto a circuit board this way may be less expensive than other waveguide-manufacturing techniques.

As the example air waveguide antenna can be manufactured by stacking the single-layer material atop the circuit board, the two materials may be held together by a mechanical interface arranged between two adjacent surfaces. The mechanical interface may further include an electrical interface between the upper portion of the air waveguide antenna that is formed from the single layer of material, and the lower portion of the air waveguide antenna that is formed from the circuit board. The circuit board may include one or more electrical contacts that align with the channels of the air waveguide antenna so that the mechanical interface also electrically couples the two layers. This interface may eliminate a need for solder between connections that can be made directly through the interface formed between the two materials.

Because there may no longer be a need for using solder to attach the air waveguide antenna to the circuit board, there may be less risk of causing thermal damage to either the circuit board or the single layer of material (e.g., a metal-coated plastic). These less stringent manufacturing requirements may be easier to achieve, resulting in fewer manufacturing steps performed, and fewer defects, which can reduce costs, particularly when manufactured in large quantities. The example air waveguide may, therefore, be far easier and less expensive to manufacture than existing waveguide technology.

Example Environment

FIG. 1 illustrates an example environment 100 in which a radar system 102 with a single layer 104 air waveguide antenna 106 is integrated on a circuit board 108 and configured for use on a vehicle 110. The vehicle 110 may use one or more air waveguide antennas 106 to enable operations of the radar system 102. For example, responsive to receiving, from the radar system 102, radar data indicative of a position of an object 112 relative a position of the vehicle 110, the vehicle 110 performs a driving-maneuver to avoid a collision with the object 112.

Although illustrated as a car, the vehicle 110 can represent other types of motorized vehicles (e.g., a motorcycle, a bus, a tractor, a semi-trailer truck, or construction equipment), non-motorized vehicles (e.g., a bicycle), railed vehicles (e.g., a train or a trolley car), watercraft (e.g., a boat or a ship), aircraft (e.g., an airplane or a helicopter), or spacecraft (e.g., satellite). In general, manufacturers can mount the radar system 102 to any moving platform, including moving machinery or robotic equipment. In other implementations, other devices (e.g., desktop computers, tablets, laptops, televisions, computing watches, smartphones, gaming systems, and so forth) may incorporate the radar system 102 with the air waveguide antenna 106 and support techniques described herein.

The radar system 102 can be part of the vehicle 110. In the depicted environment 100, the radar system 102 is mounted near, or integrated within, a front portion of the vehicle 110 to detect the object 112 and avoid collisions. The radar system 102 provides a field-of-view 118 towards the object 112. The radar system 102 can project the field-of-view 118 from any exterior surface of the vehicle 110. For example, vehicle manufacturers can integrate the radar system 102 into a bumper, side mirror, headlights, rear lights, or any other interior or exterior location where the object 112 requires detection. In some cases, the vehicle 110 includes multiple radar systems 102, such as a first radar system and a second radar system that provide a larger field-of-view 118. In general, vehicle manufacturers can design the locations of the one or more radar systems 102 to provide a particular field-of-view 118 that encompasses a region of interest, including, for instance, in or around a travel lane aligned with a vehicle path.

The vehicle 110 can also include at least one automotive system that relies on data from the radar system 102, including a driver-assistance system, an autonomous-driving system, or a semi-autonomous-driving system. The radar system 102 can include an interface to such automotive systems. A signal can be output, via the interface, based on electromagnetic energy received by the radar system 102. Generally, the automotive systems use radar data provided by the radar system 102 to perform a function. For example, the driver-assistance system can provide blind-spot monitoring and generate an alert indicating a potential collision with the object 112 detected by the radar system 102. In this case, the radar data from the radar system 102 indicate when it is safe or unsafe to change lanes. The autonomous-driving system may move the vehicle 110 to a particular location on the road while avoiding collisions with the object 112 detected by the radar system 102. The radar data provided by the radar system 102 can provide information about a distance to and the location of the object 112 to enable the autonomous-driving system to perform emergency braking, perform a lane change, or adjust the speed of the vehicle 110.

The radar system 102 generally includes a transmitter (not illustrated) and at least one antenna, including the air waveguide antenna 106, to transmit electromagnetic signals. The radar system 102 generally includes a receiver (not illustrated) and at least one antenna, including the air waveguide antenna 106, to receive reflected versions of these electromagnetic signals. The transmitter includes components for emitting electromagnetic signals. The receiver includes components to detect the reflected electromagnetic signals. The transmitter and the receiver can be incorporated together on the same integrated circuit (e.g., a transceiver integrated circuit) or separately on different integrated circuits. The radar system 102 also includes one or more processors (not illustrated) and computer-readable storage media (CRM) (not illustrated). The processor can be a microprocessor or a system-on-chip. The processor executes instructions stored within the CRM. As an example, the processor can control the operation of the transmitter. The processor can also process electromagnetic energy received by the air waveguide antenna 106 and determine the location of the object 112 relative to the radar system 102. The processor can also generate radar data for the automotive systems. For example, the processor can control, based on processed electromagnetic energy from the air waveguide antenna 106, an autonomous or semi-autonomous driving system of the vehicle 110.

Because forming air waveguide antennas from multiple layers of substrate material, as well as forming air waveguide antennas from stacking substrates and soldering injection-molded plastics, can be too expensive for some applications, including an automotive context where eventual mass-production is desired, the air waveguide antenna 106 consists of just two main parts.

A first main part consists of a metal or metalized-plastic layer 104 defining openings 116 (e.g., ports and radiators) into channels 114 that are filled with a dielectric, which in this example is air. The channels 114 are partially surrounded by vertical walls 120 and a ceiling 122. The purpose of the channels 114 is to guide desirable electromagnetic energy that is captured by the air waveguide antenna 106 to or from other components of the radar system 102 (e.g., a transceiver).

A second main part of the air waveguide antenna 106 consists of a portion of the circuit board 108 (e.g., a substrate or other circuit board). The single layer 104 is integrated on and attached to the circuit board 108 so as to define the channels 114 that contain the dielectric (e.g., air). The vertical walls 120 that form the channels 114 within the first main part of the air waveguide antenna 106 are mated to a surface of the circuit board 108 that is configured to define a floor 124 of the channels 114. The floor 124 is arranged opposite (e.g., substantially parallel to) the ceiling 122. When the two main parts are put together, they create an electrical connection between the air waveguide antenna 106 and other components of the radar system 102.

The single layer 104 can be formed of a single sheet of metal that is stamped or bent to take on a particular shape. The single layer 104 may consist of a metalized plastic; a surface coating of metal material may be applied to an injection-molded or printed plastic part that is at the desired shape. The single layer 104 of material may include a non-conductive core and an outer conductive surface. For example, the non-conductive core of the single layer 104 of material may include plastic and the outer conductive surface may include metal.

As shown in FIG. 1, the air waveguide antenna 106 includes two channels 114. Generally, the channels 114 define a rectangular cavity surrounded by three vertical walls 120 with an opening at one end. The channels 114 and the openings 116 manipulate the electromagnetic energy in a manner that is advantageous for a particular application of the air waveguide antenna 106. The vertical walls 120 of the channels 114 (e.g., surfaces of the channels 114 that are perpendicular relative to the flow of electromagnetic energy that passes through the channels 114) guide the electromagnetic energy in a lateral direction across a surface of the circuit board 108. The ceiling 122 and the floor 124 of the channels 114 (e.g., surfaces that are parallel to the flow of electromagnetic energy that passes through the channels) regulate, in a perpendicular direction, in-flow and out-flow of the electromagnetic energy through the openings 116.

For example, the single layer 104 includes the openings 116 extending through the ceiling 122 and into the channels 114, which permit undesirable electromagnetic energy (e.g., energy that is outside an operating frequency) to escape the air waveguide 106, and which allow desirable electromagnetic energy (e.g., energy that is inside the operating frequency) to flow within the air waveguide 106. The openings 116 allow electromagnetic energy to enter the channels 114 (e.g., acting as ports) and exit the channels 114 (e.g., acting as radiators or slots).

The floor 124 of the channels 114, which is provided by the circuit board 108, prevents electromagnetic energy that passes through the channels 114 from escaping the air waveguide 106 through the circuit board 108. The floor 124 of the channels 114 is formed by an exterior surface of the circuit board 108 that is in contact with the vertical walls 120 of the single layer 104. Although not shown in FIG. 1, the floor 124 of the channels 114 may include a connection to a wire, a pad, or a trace that electrically couples the air waveguide antenna 106 to other components of the radar system 102, for instance, other components (not shown) that are integrated on or otherwise attached to the circuit board 108. Positioned opposite the circuit board 108, the ceiling 122 of the channels 114 (e.g., surfaces that are parallel to the flow of electromagnetic energy that passes through the channels) regulates in-flow and out-flow of the electromagnetic energy above the circuit board 108 and through the through openings 116.

The layer 104 can be any solid material, including wood, carbon fiber, fiberglass, metal, plastic, or a combination thereof. One common material used for the layer 104 is injection molded plastics (e.g., filled PEI). The layer 104 may be metalized (e.g., coated via plating, physical vapor deposition, painting, or other forms of metallization). The metal used to metalize the layer 104 may be silver, silver alloy, copper, aluminum, cold-rolled steel, stainless steel, or other conductive metal.

The layer 104 shares an interface 126 to the circuit board 108. The interface 126 provides a mechanical joint between the two materials. In addition, the interface 126 can provide an electrical function. The interface 126 may be referred to as "an electrically connecting layer".

The air waveguide antenna 106 can be manufactured by stacking the single layer 104 atop the circuit board 108. The two materials may be held together by the interface 126, which is configured as a mechanical interface arranged between two adjacent surfaces, in addition to being configured as an electrical interface between the two pieces, as well.

With regards to the mechanical interface provided by the interface 126, in some examples, the interface 126 includes a friction joint formed by external pressure placed around the two adjacent surfaces (e.g., using claps, screws, other fasteners). The interface 126 may include a pattern of mechanical features (e.g., protrusions, dimples, bumps, teeth, blocks, snap-fasteners, ball-and-sockets, reciprocal-roughed-surfaces) on one or both of the adjacent surfaces such that, when held together under pressure, the features cause a bond that restricts lateral movement and, therefore, maintains vertical alignment, between the two materials. In some cases, the interface 126 between the two air waveguide pieces includes an adhesive joint, a taped-joint, a soldered joint, a weld, a reflow-soldered joint with low-temperature solder, a dispensed conductive or non-conductive adhesive joint, a pressure-sensitive adhesive, a low-pressure sintered-joint, a hot-bar soldered joint, or other type of connection.

The interface 126 may further include an electrical coupling, or electrical interface, between the upper portion of the air waveguide antenna 106 that is formed from the single layer 104 of material, and the lower portion of the air waveguide antenna 106 that is formed from the circuit board 108.

Although not shown in FIG. 1, the circuit board 108 may include one or more electrical contacts that align with the channels 114 of the air waveguide antenna 106 so that the interface 126 also electrically couples the two materials. For example, an input or output of a transceiver or other component of the radar system 102 may be electrically coupled to the air waveguide antenna 106 through the interface 126 with the circuit board 108. As another example, the interface 126 may electrically couple the air waveguide antenna 106 to a common potential of the radar system 102. This interface 126 may eliminate a need for solder between connections that can instead be made directly through the interface 126.

The single layer 104 of material can be structurally secured to the circuit board 108 and electrically coupled to the circuit board 108 in various ways, as described in greater detail below. Generally, the interface 126 enables an inexpensive manufacturing process for the air waveguide antenna 106 without the need for solder to physically connect and electrically couple the layer 104 to the circuit board 108. Using the relatively inexpensive air waveguide antenna 106 for radar applications in vehicles 110 may ultimately contribute to greater adoption of advanced safety technology in vehicles, which may improve driving safety.

Example Air Waveguide Antenna

Figure 2:
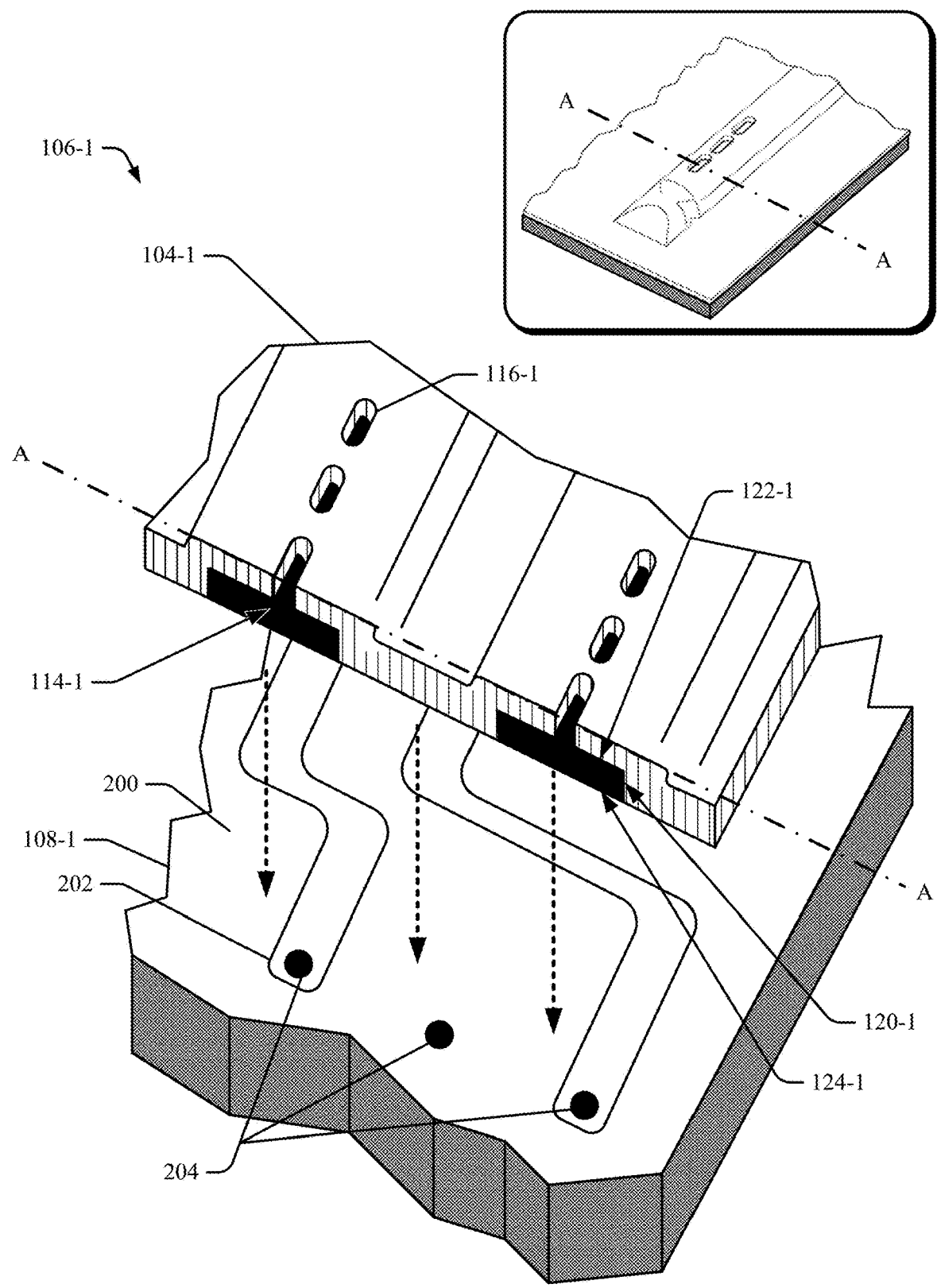
FIG. 2 illustrates an example of a single layer air waveguide antenna being integrated on a circuit board.

FIG. 2 illustrates an example of a single layer 104-1 of an air waveguide antenna 106-1 being integrated on a circuit board 108-1. The air waveguide antenna 106-1 is an example of the air waveguide antenna 106 as shown in FIG. 1.

In the top-right corner of FIG. 2, the air waveguide antenna 106-1 is shown in assembled form. The rest of FIG. 2 shows the air waveguide antenna 106-1 with a partial cut-out A-A to aid in explanation.

The layer 104-1 is aligned atop of a surface 200 of the circuit board 108-1 so that portions 202 of the surface 200 are configured as a floor 124-1 to one or more channels 114-1. Walls 120-1 and a ceiling 122-1 of the channels 114-1 are defined by the layer 104-1 of material. The ceiling 122-1 includes openings 116-1 for radiating or absorbing energy.

Also shown in FIG. 2 are example electrical connections 204 (e.g., traces, pads, terminals, pins, wires) to the circuit board 108-1. The channels 114-1 defined by the layer 104-1 can be aligned to the electrical connections 204. Other parts of the air waveguide antenna 106-1, for instance, material of the layer 104-1 that is between the channels 114-1, may include an electrical interface through the electrical connections 204, for example, to set the air waveguide 106 to a common potential.

Figure 3:
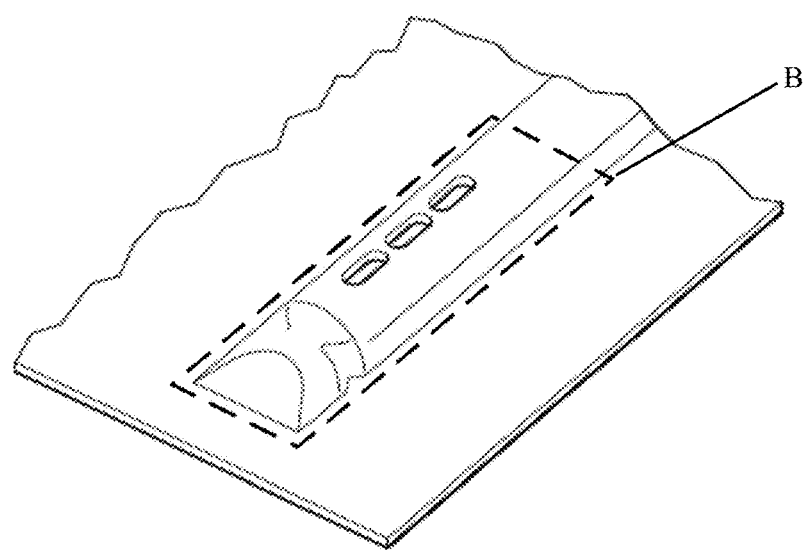
FIG. 3 illustrates an example single layer of material that, when integrated on a circuit board, is configured as a single layer waveguide antenna having channels at least partially defined by the circuit board and filled with air.
Figure 4:
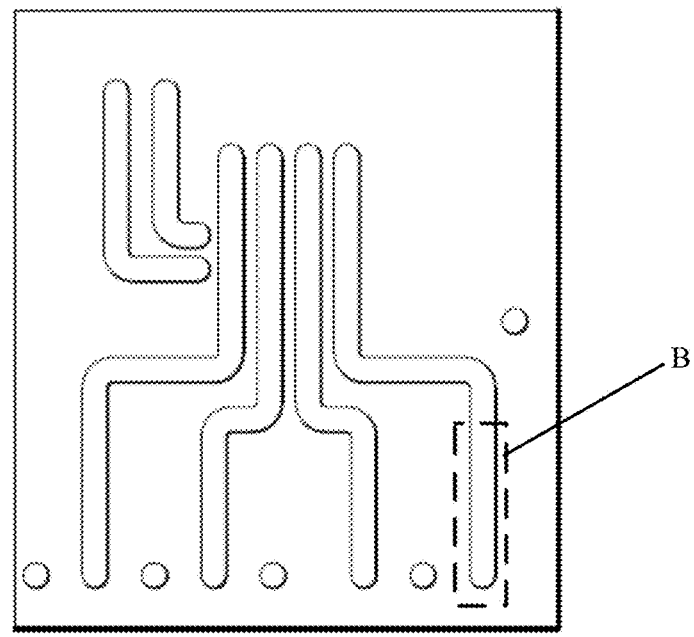
FIG. 4 illustrates an example surface of a circuit board configured to act as a floor to channels filled with air for a single layer air waveguide antenna that is integrated on the circuit board.

FIG. 3 illustrates an example single layer 104-2 of material that, when integrated on a circuit board, is configured as a single layer waveguide antenna having channels at least partially defined by the circuit board and filled with air. FIG. 4 illustrates an example surface of a circuit board 108-2 configured to act as a floor to channels filled with air for a single layer air waveguide antenna that is integrated on the circuit board. As dashed line B, a single channel with three openings through to an air dielectric is highlighted. When viewed with reference to FIG. 4, the single channel highlighted in FIG. 3 aligns with a similarly sized portion of the circuit board 108-2, shown in dashed line B.

Example Mechanical Interfaces

Figure 5:
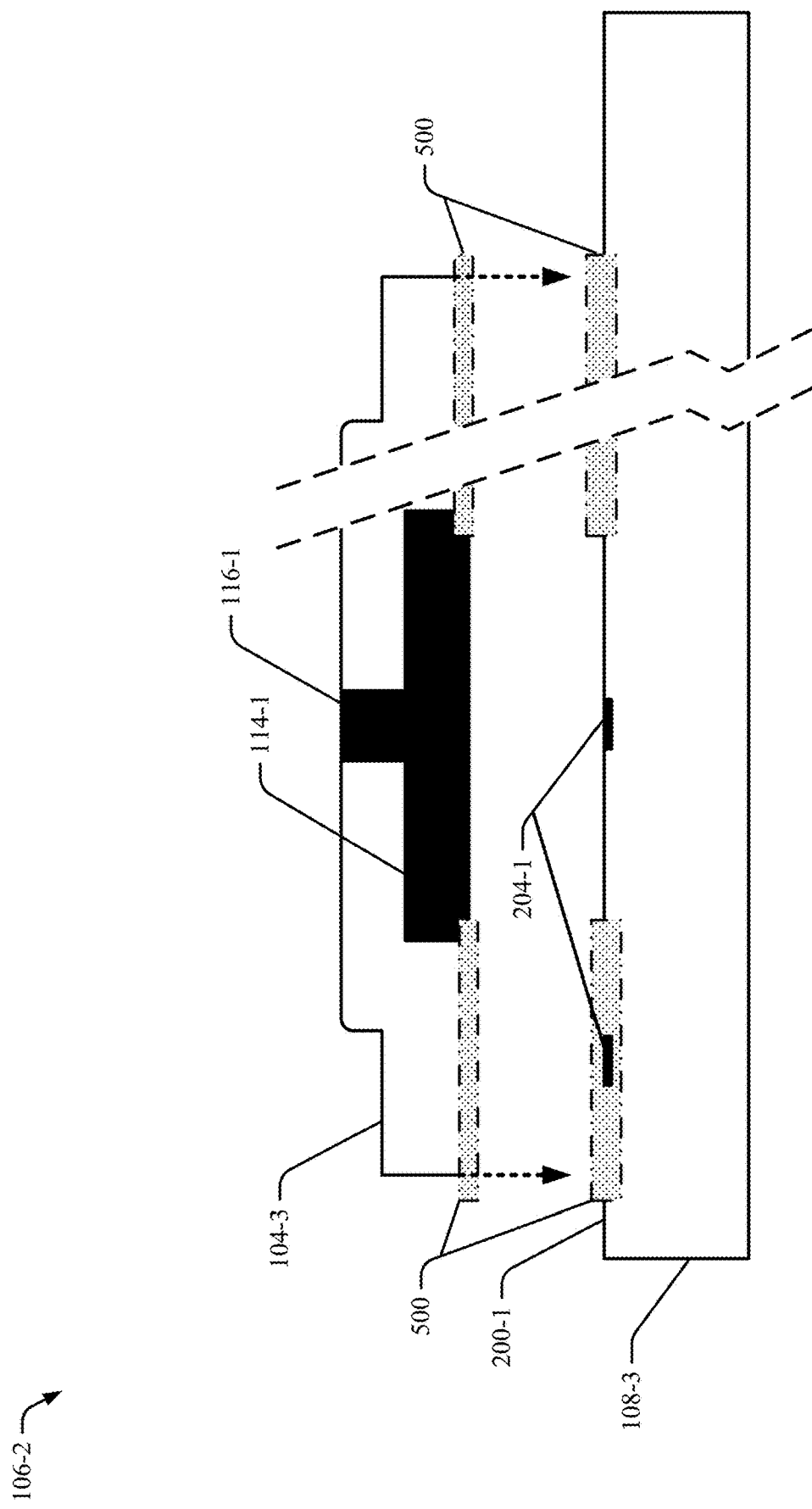
FIG. 5 illustrates another example of a single layer air waveguide antenna being integrated on a circuit board.

FIG. 5 illustrates another example of a single layer air waveguide antenna 106-2 being integrated on a circuit board 108-3. A single layer 104-3 of material is aligned over a portion (e.g., a surface 200-1) of the circuit board 108-3, to create an interface 500 and/or define the channels 114-1 and/or the openings 116-1. When the two main parts of the air waveguide antenna 106-2 are brought together as shown, the interface 500 includes a mechanical as well as an electrical feature. Electrical connections 204-1 are made between the two surfaces.

A surface of a first layer 104-3 may share the interface 500 with a complementary surface of the circuit board 108-3. For example, if the interface 500 includes a ball-and-socket type of interface, then the first interface surface may include the balls, and the second interface surface may include the sockets. Alternatively, the first and second interface surfaces may include a combination of "balls" and "sockets" as long as the balls and sockets are complimentary between adjacent surfaces. This is the case no matter which interface is used, except in the implementation where the mechanical interface on both interface surfaces is an irregular roughed area. In this implementation, the nature of the irregularity of the roughed surface, along with the layers being compressed together, enables a complementary relation between the two adjacent interface surfaces. The mechanical interface on an interface surface may be one complementary interface of one type of mechanical interface, a combination of complementary interfaces of one type of mechanical interface, or any combination of the above and including other types of mechanical interfaces. The interface 500 provides a mechanical connection between the two parts of the air waveguide antenna 106-2; lateral movement between the two parts is reduced.

The resulting interface 500 between the air waveguide antenna 106-2 and the circuit board 108-3 may reduce, if not eliminate, a need for solder at their joint. Eliminating the use of soldering techniques to electrically connect and thereby integrate an air waveguide onto a circuit board reduces costs associated with manufacturing. Attaching the air waveguide antenna 106-2 to the circuit board 108-3 without using solder presents less risk of causing thermal damage to either the circuit board 108-3 or the single layer 104-3 of material (e.g., a metal-coated plastic). These less stringent manufacturing techniques may be easier to achieve, resulting in fewer manufacturing steps performed, and fewer defects, which can reduce costs, particularly when manufactured in large quantities. These example air waveguides may, therefore, be far easier and less expensive to manufacture than existing waveguide technology.

EXAMPLE METHOD

FIG. 6 illustrates an example process 600 of manufacturing a single layer air waveguide antenna integrated on a circuit board. The process 600 can be applied to forming any of the example air waveguide antennas discussed in relation to any of the other drawings. In other words, the waveguide 106 as shown in FIG. 1 is one example of a waveguide antenna that may be formed through the process 600.

At step 602, a portion of a surface of a circuit board is identified to act as an electrical interface to waveguide channels filled with air. For example, a portion of a surface of the circuit board (e.g., an area near an electrical connection to the radar system) is configured to operate as a floor of the channels of the waveguide antenna that is being formed through the process 600 and filled with air.

At step 604, a single layer of material is obtained with conductive surfaces that define walls and a ceiling of the waveguide channels filled with air. For example, the single layer of material (e.g., metal, metal-coated plastic) can be created through injection molding techniques, or through other fabrication processes, including bending and shaping of sheet metal alone or in combination with precision cutting techniques. The single layer includes a surface that defines the ceiling and the walls of the channels being formed through the process 600 and filled with air.

At step 606, the single layer of material (i.e., obtained at step 604) is positioned atop the portion of the surface of the circuit board (i.e., identified at step 602). For example, the single layer of material is aligned with the circuit board, when the single layer and the circuit board meet this joins the single layer and the circuit board together. The resulting waveguide antenna includes cavities that define the channels, with surfaces of the channels being formed from a combination of the surface of the single layer of material and the surface of the circuit board.

At step 608, the single layer of material is attached to the portion of the surface of the circuit board to form an air waveguide antenna that is configured to guide electromagnetic energy through the waveguide channels filled with air. For example, using one or more of the techniques depicted in FIGS. 7-13, the joint between the circuit board and the single layer of material is configured as a mechanical interface that prevents separation and further prevents lateral movement. The mechanical interface formed at step 608 configures the two pieces to be a waveguide antenna device. Cost and material savings can be realized from integrating waveguide technology onto circuit boards using the process 600, when compared to traditional waveguide manufacturing techniques. FIGS. 7-13 illustrate different techniques for attaching a single layer of material to a surface of a circuit board to form a single layer air waveguide antenna that is integrated on the circuit board.

In many cases, the mechanical interface formed at step 602 includes an electrical interface formed from performing the process 600. For example, the mechanical connection between the single layer of material and the circuit board can also provide an electrical function, such as enabling an electrical connection (e.g., the electrical connections 204 as shown in FIG. 2) between the single layer of material and the circuit board. This electrical connection may include a common potential of the circuit board, a connection to an antenna array, or port of a radar chip (e.g., MMIC).

Figure 7:
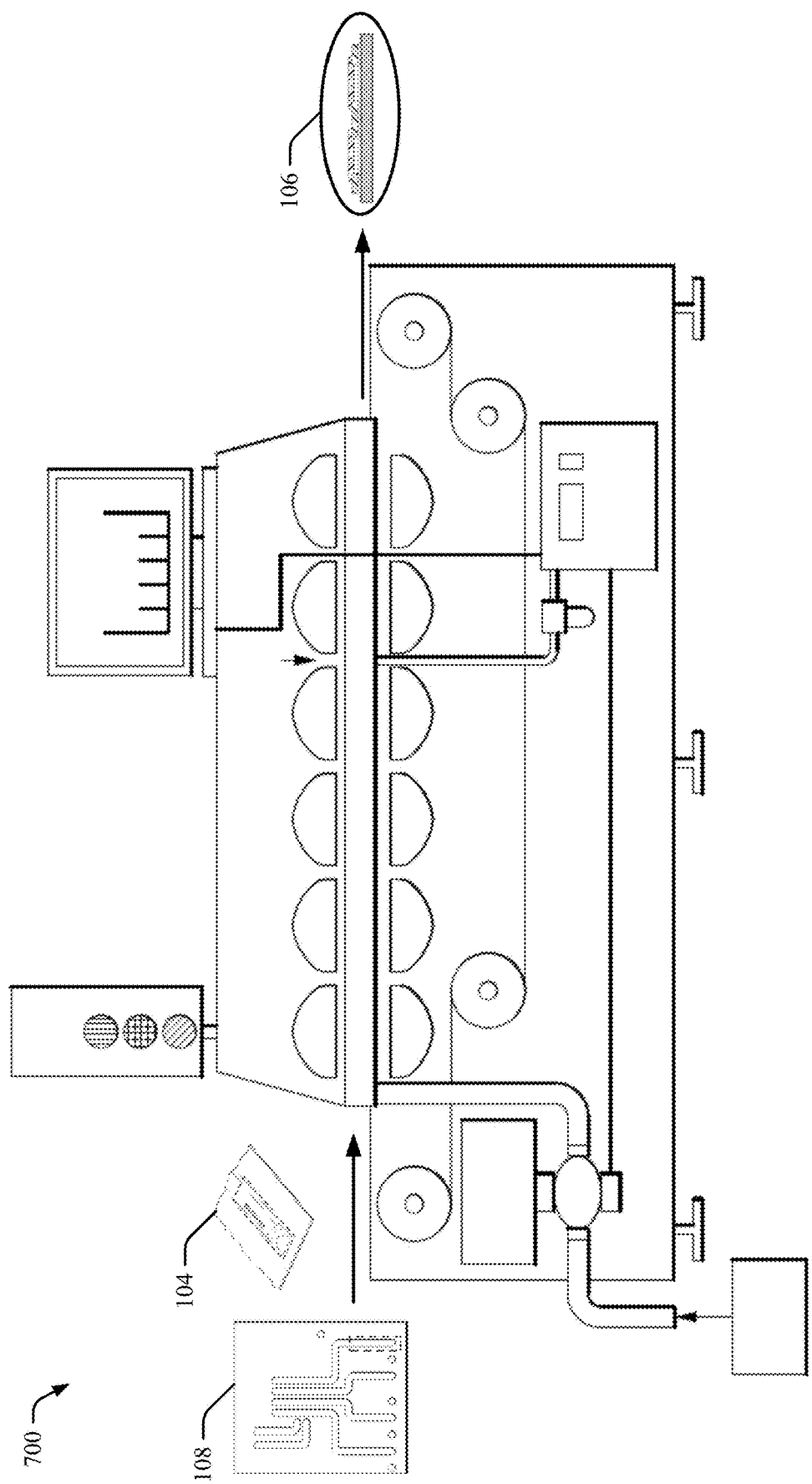
FIGS. 7-13 illustrate different techniques for attaching a single layer of material to a surface of a circuit board to form a single layer air waveguide antenna that is integrated on the circuit board.

In FIG. 7, a system 700 performs the attaching at step 608 of the process 600 in FIG. 6 includes attaching the single layer of material to the portion of the surface of the circuit board comprises reflow soldering the single layer of material to the circuit board using a low-temperature solder. As shown in FIG. 7, an electrical interface between the single layer 104 of material and the circuit board 108 can be formed using a reflow soldering, including a low-temperature solder (e.g., based on compounds of one or more of argon (Ag), benzyl (Bn), cadmium (Cd), indium (In), lead (Pb), or silicon (Si)) other elements that have a low-temperature melting point in a range of thirty to two-hundred degrees Celsius) to form the waveguide 106. Using a high-temperature solder may cause thermal damage to the single layer 104 of material or the circuit board 108, even if precautions are taken. When performing low-temperature soldering, a machine controls movement of the two materials during reflow when fixturing and pins are added to the circuit board 108. To prevent portions of the low-temperature solder from acting as in-solder, a solder resist may be used to prevent in-solder from leaking into the channels. Metal removed from a metalized plastic surface can be used to create a solder resist.

Figure 8:
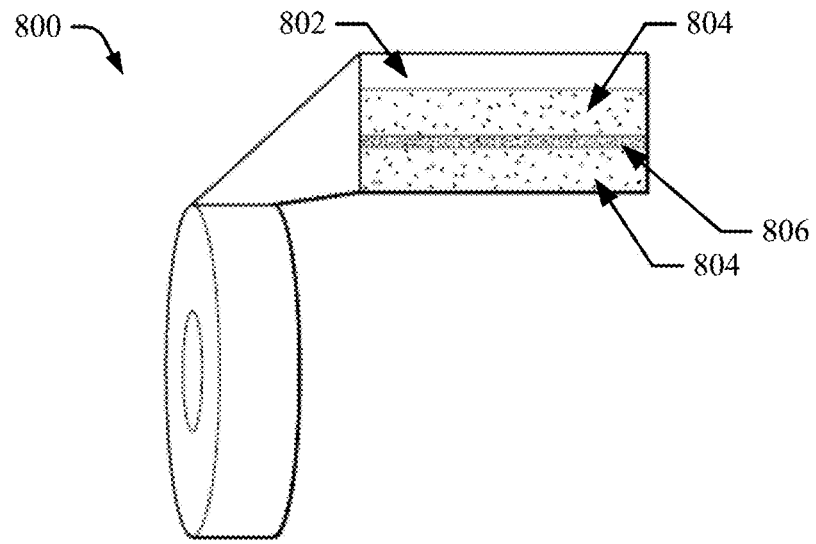
Figure 9:
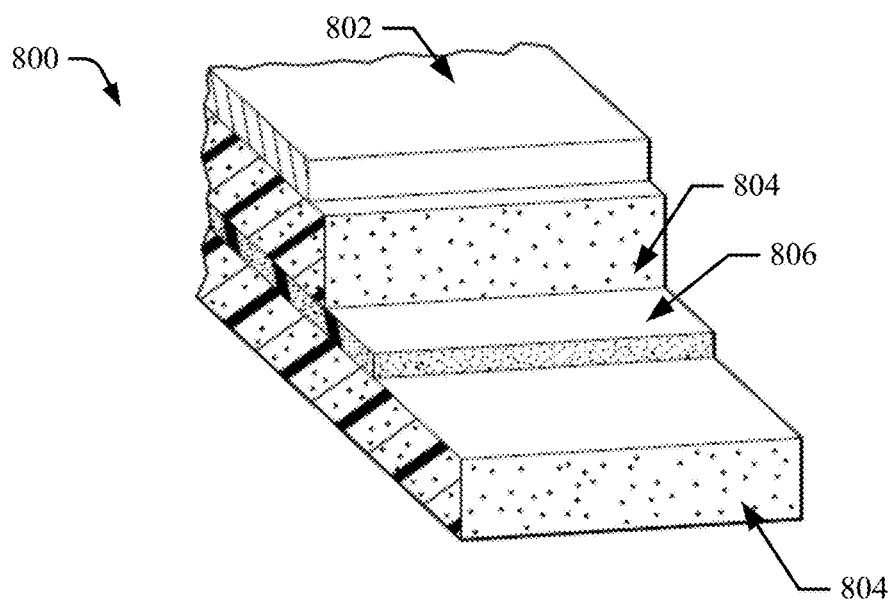

In FIGS. 8 and 9, a pressure-sensitive adhesive 800 is shown that can form the interface between the circuit board and the single layer of material. The adhesive 800 may include a double-sided tape. FIG. 8 depicts the adhesive 800 as having a release liner 802, as well as a carrier layer 804 sandwiched between two adhesive layers 806. FIG. 9 illustrates the adhesive 800 from a different perspective.

The adhesive 800 can be applied to the single layer of material or the circuit board. The adhesive can be conductive adhesive or a mixture of conductive and non-conductive materials. The conduction of the adhesive 800 is considered when preparing the single layer of material and the circuit board to ensure conductive materials are used where an electrical interface is needed and allow non-conductive materials to be used for cost or other considerations in areas where a mechanical interface alone is sufficient. The adhesive 800 may be a pressure-sensitive adhesive cut to shape and used to adhere the single layer of material to the circuit board. Because the adhesive is at least partially filled with conductive particles, it electrically connects the waveguide antenna to the circuit board around the perimeter of the channels. In addition, or instead of using the adhesive 800, other adhesives may be dispensed on either the circuit board or the single layer of material to join the two pieces of the waveguide antenna.

Figure 10:
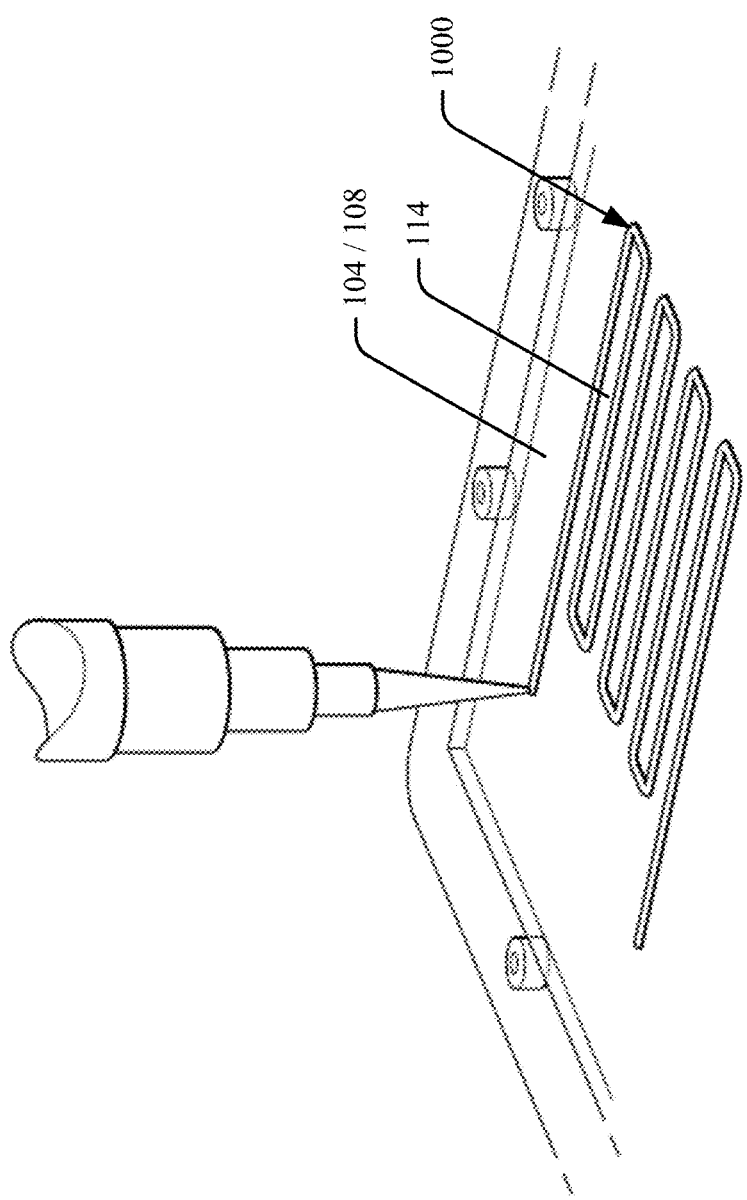

FIG. 10 depicts a conductive adhesive 1000 that can be dispensed or printed around the perimeter of the channels 114 to ensure adequate electrical connection from the single layer 104 to the circuit board 108. Non-conductive adhesive could be used in other areas to possibly reduce cost.

Figure 11:
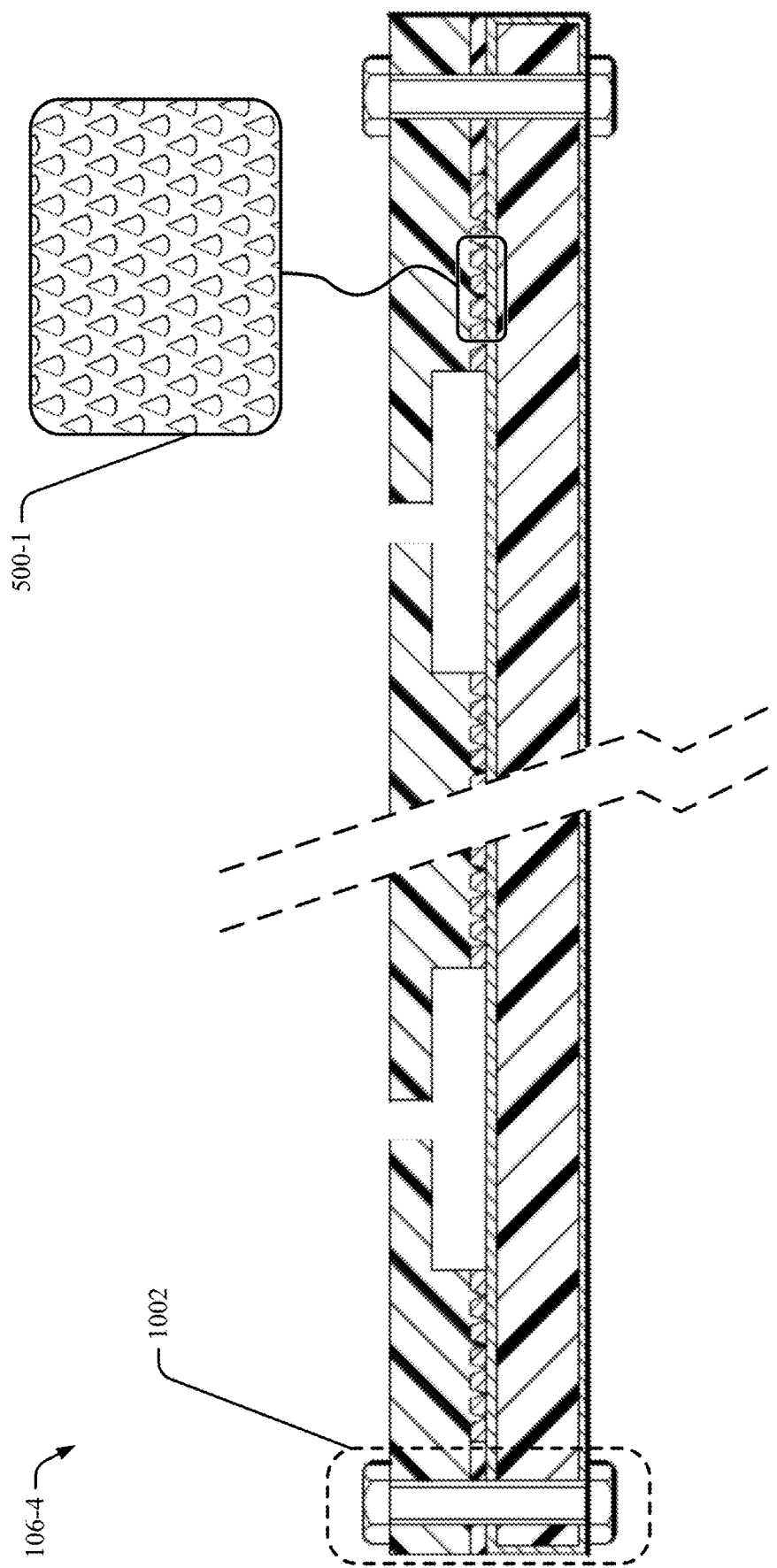

FIG. 11 illustrates an example air waveguide antenna 106-4. FIG. 11 illustrates that attaching the single layer of material to the portion of the surface of the circuit board at step 608 of the process 600 in FIG. 6 may include securing the single layer of material to the circuit board with a mechanical fastener 1002. The mechanical fastener 1002 can be a screw, a pin, a bolt, or other component that keeps pressure between the single layer of material and the circuit board.

FIG. 11 illustrates that attaching the single layer of material to the portion of the surface of the circuit board at step 608 of the process 600 in FIG. 6 may include securing the single layer of material to the circuit board by performing a low-pressure sintering of the single layer of material to the circuit board. The single layer of material to the portion of the surface of the circuit board at step 608 of the process 600 in FIG. 6 may include forming piercing dimples during the molding operation of the single layer of material to form an interface 500-1 located between the channels. Similarly, dimples can be formed in an all-metal version of the single layer of material. The dimples of the interface 500-1 are then metalized by PVD or plating. The dimples can then be pressed into a solder that has been previously printed and reflowed on the circuit board.

FIG. 11 illustrates that attaching the single layer of material to the portion of the surface of the circuit board at step 608 of the process 600 in FIG. 6 may include securing the single layer of material to the circuit board by performing a reflow soldering of the single layer of material to the circuit board. The single layer of material to the portion of the surface of the circuit board at step 608 of the process 600 in FIG. 6 may include forming piercing dimples during the molding operation of the single layer of material to form an interface 500-1 located between the channels. Similarly, dimples can be formed in an all-metal version of the single layer of material. The dimples of the interface 500-1 are then metalized by PVD or plating. The dimples can then be pressed into a solder that has been previously printed and reflowed on the circuit board. This technique results in an electrical and mechanical function for the interface 500-1.

Although not shown, the interfaces 500 (FIG. 5) or 500-1 (FIG. 11) can include other features or structures to enable a secure connection between the layer of material and the circuit board. For example, the pattern of dimples can be replaced with a pattern of teeth, ridges, protrusions, or other features that mate to a corresponding pattern of elements in the circuit board.

Figure 12:
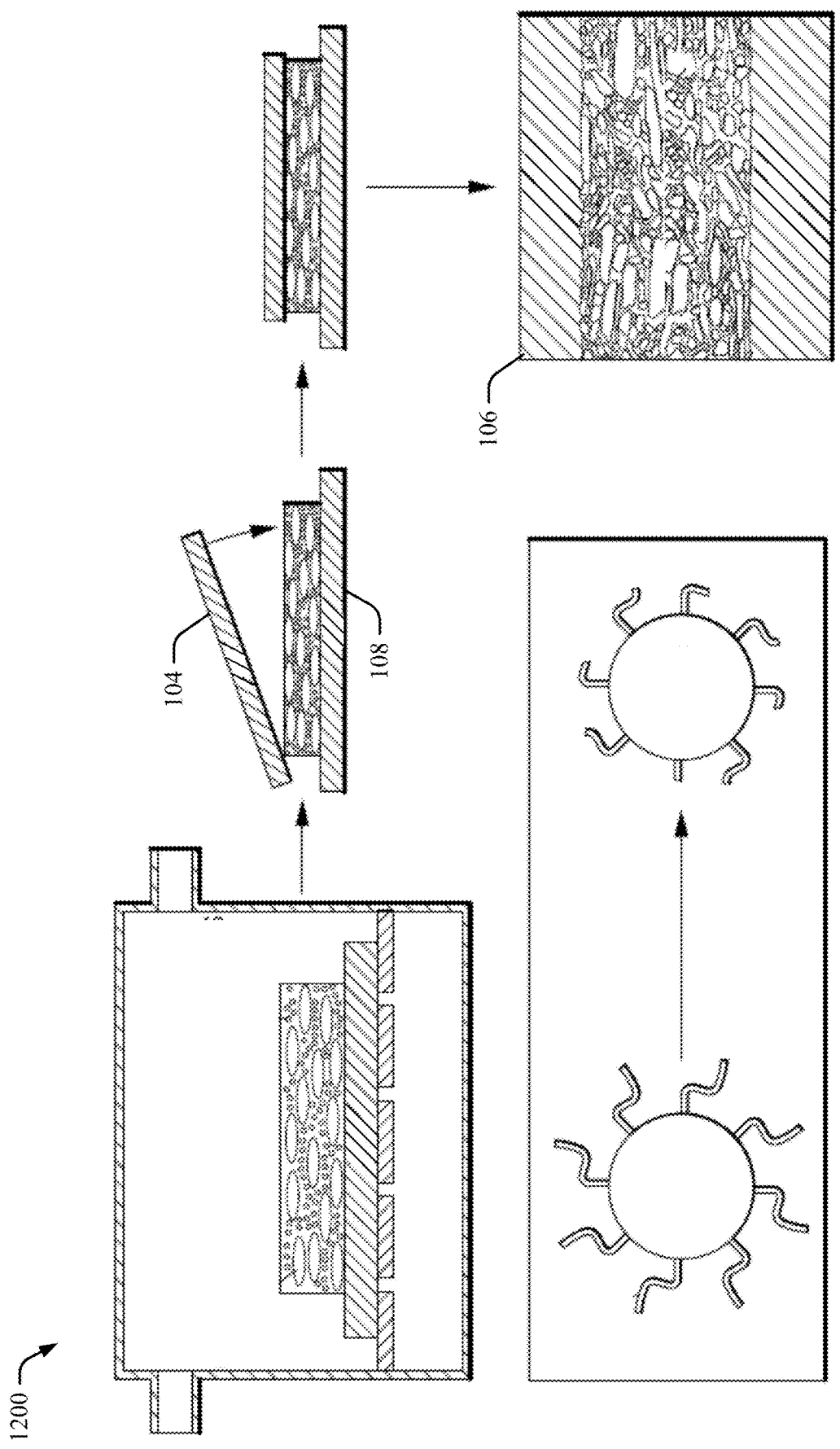

FIG. 12 illustrates a system 1200 for attaching the single layer 104 of material to the portion of the surface of the circuit board 108 at step 608 of the process 600 shown in FIG. 6 may include securing the single layer 104 of material to the circuit board 108 by performing a low-pressure sintering of the single layer 104 of material to the circuit board 108 to form the waveguide 106. The low or no pressure sintering (e.g., using Cu, using Ag) can be used to electrically attach the single layer 104 of material to the circuit board 108. Sintering process temperatures are around two hundred to two hundred and forty degrees Celsius, which requires a silver or copper screen printable sintering material to be used for the single layer 104. Once sintered, the joint can survive over nine hundred degrees Celsius and is not affected by subsequent soldering operations.

Figure 13:
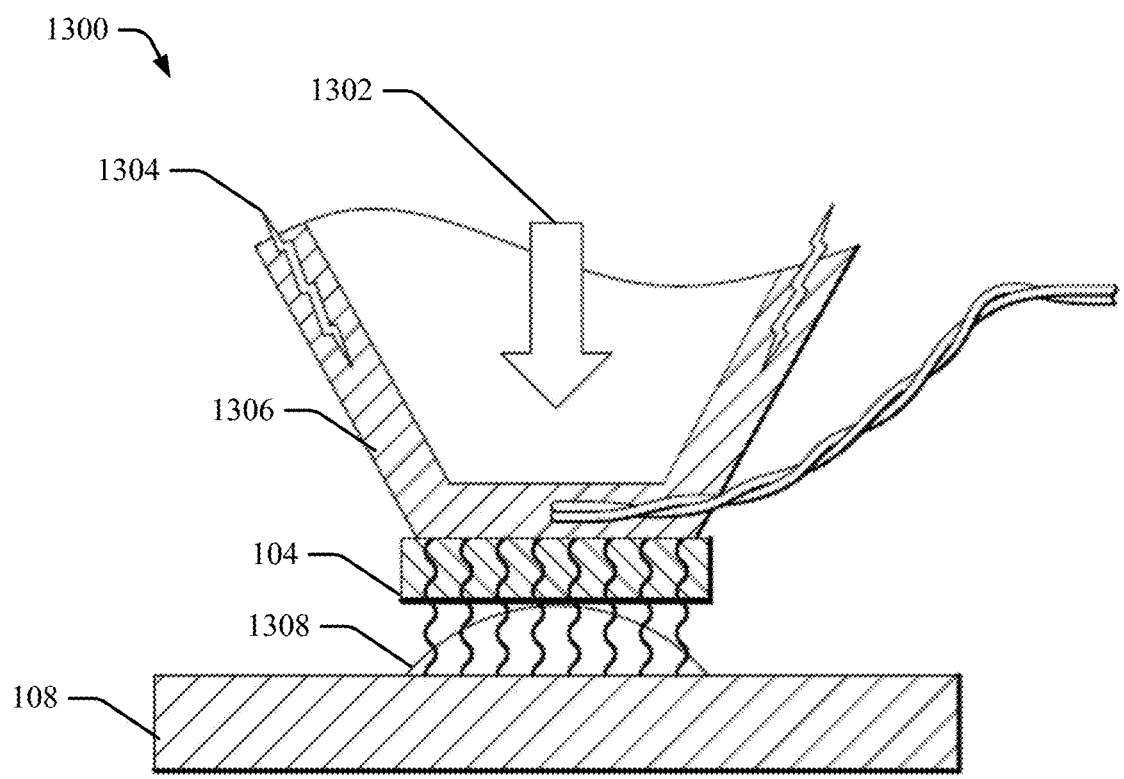

FIG. 13 illustrates a system 1300 for attaching the single layer 104 of material to the portion of the surface of the circuit board 108 at step 608 of the process 600 in FIG. 6 may include securing the single layer 104 of material to the circuit board 108 by performing a hot bar soldering of the single layer 104 of material to the circuit board 108. A hot bar tool 1306 is made to fit the topography of the single layer 104 of material. Solder 1308 is printed on the circuit board 108. The single layer 104 of material is placed onto the circuit board 108, and the hot bar tool 1306 contacts a surface of the single layer 104 of material in response to a pressure 1302 being applied to the hot bar tool 1306 (i.e., as denoted by the downward arrow), and the hot bar tool 1306 applies heat via an electrical current 1304 to reflow the solder 1308 and create a metallic joint between the circuit board 108 and the resulting waveguide antenna.

ADDITIONAL EXAMPLES

The following are some additional examples that can be considered apart or in combination with any of the examples described above to form single layer air waveguide antennas that are integrated on circuit boards.

Example 1

An apparatus, the apparatus comprising: an air waveguide antenna configured to guide electromagnetic energy through channels filled with air, the air waveguide comprising: an electrical interface to a circuit board, the electrical interface configures a portion of a surface of the circuit board to act as a floor of the channels filled with air; and a single layer of material having conductive surfaces and positioned atop the electrical interface to define walls and a ceiling of the channels filled with air.

Example 2

The apparatus of any example above or below, wherein the electrical interface to the circuit board comprises a reflow soldering to the circuit board including a low-temperature solder.

Example 3

The apparatus of any example above or below, wherein the electrical interface to the circuit board comprises a conductive adhesive to the circuit board.

Example 4

The apparatus of any example above or below, wherein the electrical interface to the circuit board comprises a non-conductive adhesive to the circuit board.

Example 5

The apparatus of any example above or below, wherein the electrical interface to the circuit board comprises a pressure-sensitive adhesive to the circuit board.

Example 6

The apparatus of any example above or below, wherein the electrical interface to the circuit board further comprises a mechanical interface to the circuit board.

Example 7

The apparatus of any example above or below, wherein the mechanical interface to the circuit board comprises a pattern of teeth that mate to a corresponding pattern of teeth in the circuit board.

Example 8

The apparatus of any example above or below, wherein the electrical interface to the circuit board comprises a low-pressure sintering to the circuit board.

Example 9

The apparatus of any example above or below, wherein the electrical interface to the circuit board comprises a hot bar soldering to the circuit board.

Example 10

The apparatus of any example above or below, wherein the floor of the channels filled with air is parallel to the ceiling of the channels filled with air.

Example 11

The apparatus of any example above or below, wherein the walls of the channels filled with air are orthogonal to the floor of the channels filled with air.

Example 12

The apparatus of any example above or below, wherein the single layer of material is positioned atop the electrical interface to further define an opening to the channels filled with air, the opening to the channels filled with air comprises a rectangular opening, two sides of the rectangular opening including the walls of the channels filled with air, and two other sides of the rectangular opening including the ceiling and the floor of the channels filled with air.

Example 13

The apparatus of any example above or below, wherein the single layer of material comprises a non-conductive core and an outer conductive surface.

Example 14

The apparatus of any example above or below, wherein the non-conductive core comprises plastic and the outer conductive surface comprises metal.

Example 15

The apparatus of any example above or below, wherein the single layer of material comprises metal.

Example 16

The apparatus of any example above or below, wherein the ceiling of the channels filled with air comprises one or more slots configured to radiate the electromagnetic energy.

Example 17

A method, the method comprising: identifying a portion of a surface of a circuit board to act as an electrical interface to waveguide channels filled with air; obtaining a single layer of material with conductive surfaces that define walls and a ceiling of the waveguide channels filled with air; positioning the single layer of material atop the portion of the surface of the circuit board; and attaching the single layer of material to the portion of the surface of the circuit board to form an air waveguide antenna that is configured to guide electromagnetic energy through the waveguide channels filled with air.

Example 18

The method of any example above or below, wherein attaching the single layer of material to the portion of the surface of the circuit board comprises reflow soldering the single layer of material to the circuit board using a low-temperature solder.

Example 19

The method of any example above or below, wherein attaching the single layer of material to the portion of the surface of the circuit board comprises applying an adhesive to the single layer of material or the circuit board.

Example 20

The method of any example above or below, wherein attaching the single layer of material to the portion of the surface of the circuit board comprises securing the single layer of material to the circuit board with a mechanical fastener.

Example 21

The method of any example above or below, wherein attaching the single layer of material to the portion of the surface of the circuit board comprises performing a low-pressure sintering of the single layer of material to the circuit board.

Example 22

The method of any example above or below, wherein attaching the single layer of material to the portion of the surface of the circuit board comprises performing a hot bar soldering of the single layer of material to the circuit board.

Example 23

The method of any example above or below, wherein attaching the single layer of material to the portion of the surface of the circuit board comprises forming a mechanical interface between the single layer of material and the circuit board.

Example 24

The method of any example above or below, wherein the mechanical interface comprises the electrical interface.

Example 25

The method of any example above or below, wherein forming the mechanical interface between the single layer of material and the circuit board comprises enabling an electrical connection between the single layer of material and the circuit board.

Example 26

The method of any example above, wherein the electrical connection comprises a common potential of the circuit board.

Example 27

A system comprising means for performing the method of any example above.

Example 28

A system comprising at least one processor configured to control manufacturing equipment to perform the method of any example above.

Example 29

A computer-readable storage medium comprising instructions that, when executed, cause at least one processor of a system to control manufacturing equipment to perform the method of any example above.

CONCLUSION

While various embodiments of the disclosure are described in the foregoing description and shown in the drawings, it is to be understood that this disclosure is not limited thereto but may be variously embodied to practice within the scope of the following claims. From the foregoing description, it will be apparent that various changes may be made without departing from the scope of the disclosure as defined by the following claims. In addition to radar systems, problems associated with signal attenuation can occur in other radio frequency (RF) systems. Therefore, although described as a way to improve radar antennas and air waveguide antennas for vehicle systems, the techniques of the foregoing description can be applied outside a vehicle context.

The use of "or" and grammatically related terms indicates non-exclusive alternatives without limitation unless the context clearly dictates otherwise. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

What is claimed is:

1. An antenna system comprising:
a circuit board including an exposed area of a conductive layer that is configured as:
an electrical interface configured to send or receive electromagnetic signals based on energy guided through a waveguide channel formed atop the exposed area to configure the exposed area to be a channel floor; and
a mechanical interface configured to prevent separation or lateral movement at the electrical interface between the channel floor and a channel ceiling and channel walls formed atop the channel floor, wherein the mechanical interface comprises a solder or a sinter that affixes the channel walls to the exposed area of the conductive layer; and
a single piece of conductive material shaped to form the channel ceiling and the channel walls that are coupled to the electrical interface to complete the waveguide channel and the mechanical interface from being arranged atop the exposed area of the circuit board.

2. The antenna system of claim 1, wherein the electrical interface and the mechanical interface are integrated in a joint formed by a contour of the channel floor in the circuit board that extends to the channel walls in the single piece of conductive material atop the channel floor.

3. The antenna system of claim 1, wherein the mechanical interface further comprises metal teeth formed in the exposed area of the conductive layer configured in a pattern to mate with corresponding teeth formed in portions of the channel walls adjacent to the channel floor.

4. The antenna system of claim 1, wherein the system comprises a radar system including the circuit board.

5. The antenna system of claim 4, wherein the radar system is configured to emit or detect the electromagnetic energy from the waveguide channel.

6. The antenna system of claim 5, wherein the radar system comprises a processor configured to determine an object relative to the radar system in response to receiving signals based on the electromagnetic energy.

7. The antenna system of claim 1, wherein the solder or the sinter comprises at least one of a reflowed low-temperature solder, a hot bar solder, or a low-pressure sinter.

8. The antenna system of claim 1, wherein the single piece of conductive material is shaped to define a rectangular opening at the mechanical interface between the electrical interface and the waveguide channel.

9. The antenna system of claim 1, wherein the single piece of conductive material comprises a non-conductive core and an outer conductive surface.

10. The antenna system of claim 9, wherein the non-conductive core comprises plastic and the outer conductive surface comprises metal.

11. The antenna system of claim 1, wherein the electrical interface is configured to enable components coupled to the conductive layer of the circuit board to send or receive the electromagnetic signals based on energy captured in the waveguide channel and allowed to propagate along the channel floor.

12. The antenna system of claim 1, wherein the waveguide channel is filled with air.

13. The antenna system of claim 1, wherein the channel ceiling comprises one or more slots configured to radiate the energy from the waveguide channel.

14. The antenna system of claim 1, wherein the waveguide channel comprises one of multiple waveguide channels formed between multiple electrical interfaces formed in other exposed areas on the circuit board, and the single piece of conductive material comprises one of multiple single pieces of conductive material each shaped to form additional channel walls atop an additional channel floor in at least one of the other exposed areas.

15. The antenna system of claim 1, wherein the channel floor is parallel to the channel ceiling, and the channel walls are orthogonal to both the channel floor and the channel ceiling.

16. An antenna system comprising:
a circuit board including an exposed area of a conductive layer that is configured as:
an electrical interface configured to send or receive electromagnetic signals based on energy guided through a waveguide channel formed atop the exposed area to configure the exposed area to be a channel floor; and
a mechanical interface configured to prevent separation or lateral movement at the electrical interface between the channel floor and a channel ceiling and channel walls formed atop the channel floor; and
a single piece of conductive material shaped to form the channel ceiling and the channel walls that are coupled to the electrical interface to complete the waveguide channel and the mechanical interface from being arranged atop the exposed area of the circuit board, wherein the single piece of conductive material comprises a non-conductive core and an outer conductive surface.

17. A radar system comprising an antenna system having:
a circuit board including an exposed area of a conductive layer that is configured as:
an electrical interface configured to send or receive electromagnetic signals based on energy guided through a waveguide channel formed atop the exposed area to configure the exposed area to be a channel floor; and
a mechanical interface configured to prevent separation or lateral movement at the electrical interface between the channel floor and a channel ceiling and channel walls formed atop the channel floor; and
a single piece of conductive material shaped to form the channel ceiling and the channel walls that are coupled to the electrical interface to complete the waveguide channel and the mechanical interface from being arranged atop the exposed area of the circuit board.

* * * * *